(12) United States Patent
Melcher et al.

(10) Patent No.: US 8,421,011 B2
(45) Date of Patent: Apr. 16, 2013

(54) GLASS PANE HAVING A DETECTOR FOR ELECTROMAGNETIC RADIATION

(75) Inventors: Martin Melcher, Herzogenrath (DE); Jan Gruenert, Hamburg (DE); Karl-Josef Ollfisch, Roetgen (DE); Marc Maurer, Compiegne (DE)

(73) Assignee: Saint-Gobain Glass France, Aubervilliers (FR)

( * ) Notice: Subject to any disclaimer, the term of this patent is extended or adjusted under 35 U.S.C. 154(b) by 273 days.

(21) Appl. No.: 12/676,679

(22) PCT Filed: Sep. 4, 2008

(86) PCT No.: PCT/EP2008/007227
§ 371 (c)(1), (2), (4) Date: Oct. 20, 2010

(87) PCT Pub. No.: WO2009/030476
PCT Pub. Date: Mar. 12, 2009

(65) Prior Publication Data
US 2011/0027515 A1    Feb. 3, 2011

(30) Foreign Application Priority Data
Sep. 5, 2007  (DE) .......................... 10 2007 042 028

(51) Int. Cl.
*B32B 17/06* (2006.01)
(52) U.S. Cl.
USPC ..................... 250/330; 250/336.1; 250/338.1; 250/339.06; 250/341.8
(58) Field of Classification Search .................. 250/338.1
See application file for complete search history.

(56) References Cited

U.S. PATENT DOCUMENTS

| | | |
|---|---|---|
| 5,436,060 A | 7/1995 | Saurer et al. |
| 2004/0160688 A1 | 8/2004 | Noguchi et al. |
| 2006/0250711 A1 | 11/2006 | Noguchi et al. |

FOREIGN PATENT DOCUMENTS

| | | |
|---|---|---|
| DE | 102 41 728 | 3/2004 |
| DE | 100 10 599 B4 | 12/2005 |
| EP | 0 723 897 | 7/1996 |
| EP | 1 462 244 | 9/2004 |
| EP | 1 464 632 | 10/2004 |
| EP | 1 710 104 | 10/2006 |
| GB | 2 271 139 | 4/1994 |
| JP | 9 188133 | 7/1997 |

OTHER PUBLICATIONS

EP0723897 translation.*
JP09-188133 translation.*

* cited by examiner

*Primary Examiner* — David Porta
*Assistant Examiner* — Djura Malevic
(74) *Attorney, Agent, or Firm* — Oblon, Spivak, McClelland, Maier & Neustadt, L.L.P.

(57) ABSTRACT

A glass pane (1) has an inner side (6) and an outer side (5) and a detector (10) located on the inner side (6) for electromagnetic radiation which, coming from the outer side (5), passes through the glass pane (1) and can be detected by means of the detector. The glass pane (1) is a composite pane, in particular a glass pane of composite safety glass of a motor vehicle, with an inner pane (3) and an outer pane (2), which are joined to each other with the aid of a film (4) arranged between the inner pane (3) and the outer pane (2). In order also to obtain a sufficient intensity of the electromagnetic radiation passing through the glass pane (1) and detectable by the detector (10) in glass panes with a small transmission coefficient, it is proposed that the beam path of the electromagnetic radiation leading to the detector (10) penetrate only the material of the outer pane (2) and pass through the plane of the inner pane (3) in the region of a continuous hole (7).

11 Claims, 2 Drawing Sheets

GLASS PANE HAVING A DETECTOR FOR ELECTROMAGNETIC RADIATION

Figure 1:
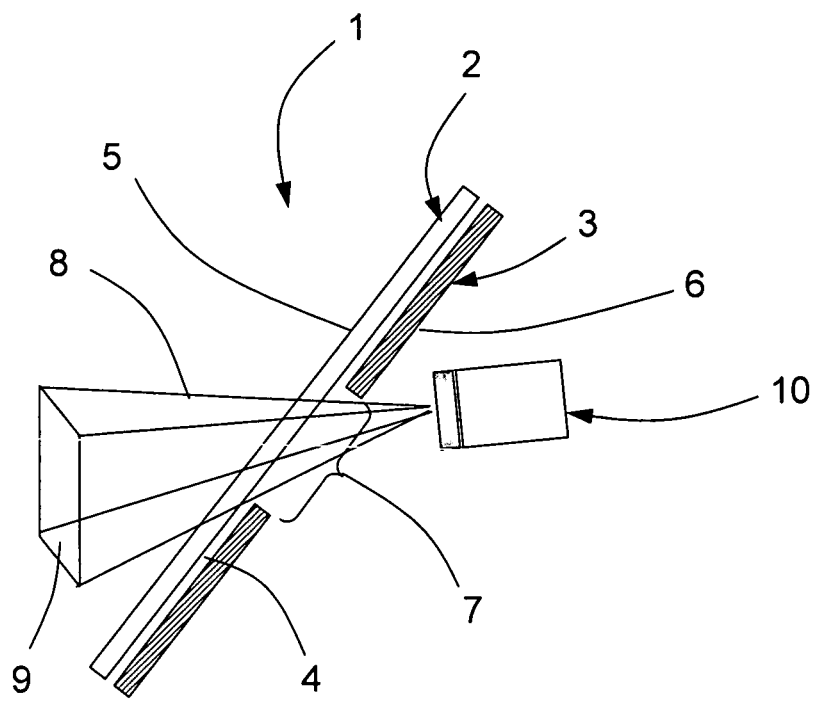

The invention relates to a glass pane having an inner side and an outer side and a detector located on the inner side for electromagnetic radiation which, coming from the outer side, passes through the glass pane and can be detected by means of the detector, the glass pane being a composite pane with an inner pane and an outer pane, which are joined to each other with the aid of a film arranged between the inner pane and the outer pane.

PRIOR ART

Glass panes of the aforementioned type are known generally, in particular as glass panes in the automobile sector. The tried and tested principle of what is known as the "composite glass pane" also ensures, in the event of damage or destruction of the glass pane in the form of shattering, that the glass pane does not break up into extremely small pieces—as is usual in the case of single-sheet safety glass—but overall maintains its cohesion. This makes it possible in the event of an accident, firstly, to travel onward with the vehicle if necessary and, secondly, prevents persons or limbs of the same being thrown out of the passenger compartment in the event of a rollover and, as a result, being exposed to a considerably increased risk of injury.

Also generally known are glass panes in which a detector, in the form for example of a camera for the detection of electromagnetic radiation in the visible light range or in the infrared range, is arranged on the inner side of the inner pane. In the sense of the present application, the term detector or camera is to be understood to mean any system registering on the basis of electromagnetic radiation, in particular in the range of visible light and infrared radiation. The detector can thus be, for example, a classic light-sensitive chip (CCD or CMOS component), a photodiode, a diode array or a photomultiplier.

In the known structure, the electromagnetic radiation to be detected on the inner side of the glass pane passes through the outer pane and the inner pane before it is detected by the detector. In particular in the case of glass panes which have comparatively poor transmission values for the electromagnetic radiation to be detected, the quality of the detection is frequently unsatisfactory. As a result of the absorption in the region of the glass pane, the signal arriving at the detector is frequently so weak that, in the course of the further evaluations, errors can occur or even the function of the detector system is not available.

The German translation DE 696 07 226 T2 of the European patent EP 0 723 897 B1 discloses a composite glass pane for vehicles which, in order to detect droplets on the outer side of the outer glass pane, is equipped with what is known as a rain detector on the inner side. In order to increase the detection quality, the composite film, consisting in particular of PVB or an alternative thermoplastic material, is removed in the region of the rain sensor and the latter is inserted into a continuous hole in the inner glass pane, in order to be in contact with the inner side of the outer glass pane, for example as a result of adhesive bonding. In EP 0 723 897 B1, neither is a detector for detecting electromagnetic radiation (but only an ultrasound detector) named, nor are any statements included about the quality of the (glass) materials used for the glass panes, in particular no data about the transmission coefficients with respect to electromagnetic radiation. DE 30 20 253 A1 discloses an antenna fixing in a motor vehicle glass plane. In this case, the antenna fixing is formed as a standardized component in conjunction with a holding foot for an interior mirror. At the mounting point, the windshield of the vehicle, illustrated as single-sheet glass, is provided with a continuous hole, into which a connecting screw enters which presses two flange-like halves of the antenna or mirror foot against each other, which achieves a leakproof and firm mounting of the antenna foot or mirror foot.

Furthermore, DE 199 58 879 A1 also discloses a component having a leadthrough. The component represents in particular an insulating glass pane, which comprises at least two rigid glass panes and a spacer joining the latter to each other firmly and with a predefined spacing and circumscribing a pane interspace in the manner of a frame. In this case, one of the rigid glass panes serves as a carrier pane for functional electric elements, in particular for solar cells, whose connecting leads, starting from the side of the carrier pane facing the pane interspace, are led to the outside through a hole in the other glass pane. In order to be able to choose the location of the leadthrough penetration more freely, the connecting leads are located in the interior of an annular spacer, which is in turn arranged in the interior of the frame-like spacer.

OBJECT

The invention is based on the object of further developing a glass pane having a detector for electromagnetic radiation in such a way that the reliability of the detection and evaluation of the radiation received is improved.

SOLUTION

Starting from a glass pane of the type described at the beginning, according to a first aspect of the present invention, this object is achieved in that the beam path of the electromagnetic radiation leading to the detector penetrates only the material of the outer pane and passes through the plane of the inner pane in the region of a continuous hole.

According to the invention, the detector is thus arranged behind or (partly) in the aforementioned passage hole, so that the radiation detected, before reaching the component sensitive to electromagnetic radiation, has penetrated only the material of the outer pane, so that the signal exhibits correspondingly good quality properties. In particular, in the case of the glass panes according to the invention, it is possible for the latter to have an inner pane that is tinted, for example, with a low transmission coefficient in the region of the relevant wavelength range of the radiation to be detected. Since the inner glass having the poor transmission properties is not present in the region of the beam path, the intensity of the signal to be detected is very good, since the outer pane can have a low transmission coefficient in the relevant wavelength range and, nevertheless, the composite glass pane can be tinted appropriately intensely in the remaining region outside the hole as a result of a suitable selection of the inner pane. Within the context of the present invention, the feature on the inner side of the glass pane is to be understood such that the detector is located at least on the inner side of the outer pane. In this case, it can be located wholly or partly in the passage hole according to the invention in the inner pane, since in this way overall space is saved and the structural height of the detector on the inner side can be reduced. In addition, the mechanical properties are improved and the penetration of foreign particles between detector and glass pane is prevented.

According to a refinement of the glass pane according to the invention, provision is made for the hole in the inner pane to be produced before a bending-reshaping treatment of the inner pane and for the edge region of the hole to have edge stresses running peripherally in the form of compressive stresses. In this way, the strength of the glass pane in the region of the hole can be increased and cracking in this region can be prevented.

In principle, the film for joining the inner pane and the outer pane has comparatively good optical properties. In practice, however, following the production of the hole in the inner pane, it is frequently the case that, for example in edge regions surrounding the hole, there is corrugation of the film or other impairment of the surface quality, caused by mechanical effects. For this reason, the present invention proposes removing the film in the region of the hole or the beam path passing through the latter. As a rule, the cross section of the hole and the cross section of the beam path will be matched quite well to each other, so that it is expedient to remove the film in the entire region of the hole, possibly even to a certain extent beyond this. The latter widening of the film-free region beyond the cross section of the hole has the advantage that, during the joining process of inner pane and outer pane, the molten material of the joining film is prevented from swelling out. The introduction of a hole into the film, which subsequently corresponds with the hole in the inner pane, is carried out before the lamination of the layer structure comprising inner pane, outer pane and film, in order that, when the film material is molten, this does not enter the cross section of the hole at the edges of the hole.

In order that the signal passing through the outer pane in the region of the hole in the inner pane has an adequate intensity, the outer pane should have a transmission coefficient with respect to the electromagnetic radiation that can be detected by the detector which lies in the range between 0.80 and 0.93.

Starting from a glass pane having an inner side and an outer side and a detector for electromagnetic radiation which, coming from the outer side, passes at least partly through the glass pane and can be detected by means of the detector, the glass pane being constructed as a single sheet, the basic object is achieved by a hole arranged in the region of the beam path and extending from the outer side as far as the inner side and in which the detector is preferably at least partly arranged.

A glass pane specified as above is suitable in particular as a rear window or side window of a vehicle, implemented as single-sheet glass. Even in the case of glass panes having dense tinting, which is to say having a very low transmission coefficient, as are often used in the rear part of vehicles, in the case of a glass pane characterized as above, a detector for the detection of electromagnetic radiation can be arranged, the radiation typically passing through the glass pane from the outer side, although in principle the opposite propagation direction is also conceivable or both propagation directions are present if an emitter is also arranged beside the detector, so that the hole is penetrated both by radiation entering from outside and by radiation aimed in the opposite direction. In the case of glazing which is very highly tinted and therefore in particular has a very dark effect, the existence of a continuous hole for the beam path is visually barely disruptive, since it is comparatively simple to configure the part of the detector which is visible from the outer side of the glass pane to be colored and/or configured with respect to its reflection properties such that it barely noticeably differs from the surrounding glass pane.

In order to achieve good leakproof properties and attractive esthetics, it is further proposed that the hole be closed tightly on the outer side by means of a closure element, the outer side of which terminates flush with the outer side of the glass pane or projects outward beyond the outer side of the glass pane in the region of a sealing flange projecting laterally. In this way, the detector is also reliably protected against influences from the outer side of the glass pane.

Refining the invention further, provision is made for an optical component of the detector arrangement sensitive to electromagnetic radiation to be arranged further in the direction of the outer side of the glass pane than a plane defined by the inner side of the glass pane in an edge region of the hole. In this way, overall space can be saved and the extent of the detector together with possible evaluation devices in the direction of the inner side of the glass pane can be reduced.

Alternatively, it is also possible for an optical component of the detector arrangement sensitive to electromagnetic radiation to be arranged further in the direction of the inner side of the glass pane than a plane defined by the inner side of the glass pane. In this case, the hole can be closed with a closure element which has the same thickness as the glass pane (or even a greater thickness). In this case, the sealing can be carried out very reliably and there is also a positive influence on the strength properties of the glass pane having the plug.

A development of the glass pane according to the invention additionally comprises the beam path running encapsulated within a housing, which closely adjoins the inner side of the glass panes and/or the circumferential surface of the glass pane bounding the hole. Sealing in this way prevents dirt or, for example, insects penetrating into the beam path and in this way being able to cause distortion of the values measured by the detector.

While, from the point of view of strength, the hole should preferably be designed to be circular in cross section, optimum utilization of the hole cross section and therefore minimization of its area are achieved when the hole has the form of an oval, an ellipse or a rounded trapezium in a section plane running parallel to the inner side or the outer side. The aforementioned forms are coordinated quite well with a penetration of the two elements "glass pane" on the one hand and "detection pyramid", which defines the beam path to the detector. In this case, sharp corners and edges cannot be implemented in the hole geometry, since these would represent nucleus points for cracks and since, otherwise, inadmissible stress peaks would occur, which could promote the formation of cracks in the glass pane.

One variant of a detector system that can be used consists in the glass pane likewise being provided with a transmitter for emitting such electromagnetic radiation that the radiation reflected by objects that are located in front of the glass pane at a distance from the outer side can be detected by the detector, the transmitter and the detector being combined structurally to form a sensor-detector unit.

EXEMPLARY EMBODIMENTS

Figure 2:
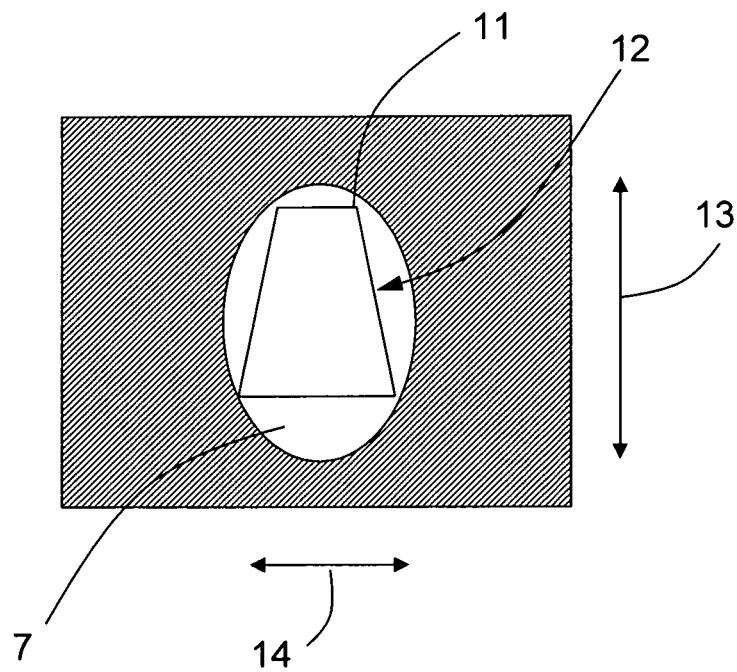
Figure 3:
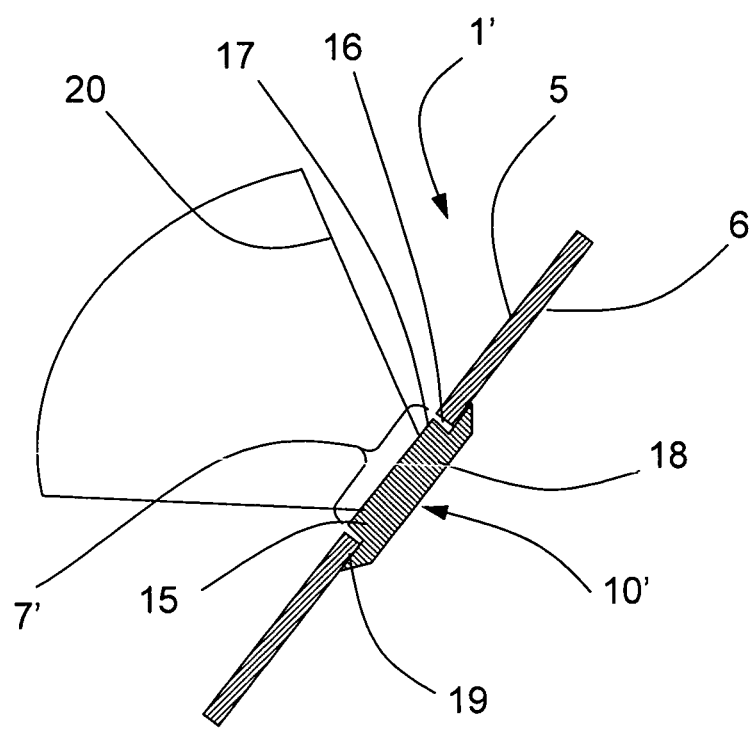

The invention will be explained in more detail below by using two exemplary embodiments of a glass pane according to the invention, which are illustrated in the drawing, in which:

FIG. 1 shows a cross section through a first embodiment of a glass pane in the form of a composite safety glass pane FIG. 2 shows a plan view of the hole in the glass pane according to FIG. 1, and FIG. 3 shows a cross section through a second embodiment of a glass pane in the form of a single-sheet safety glass.

A glass pane 1 illustrated in FIG. 1 is a composite safety glass pane, having an outer pane 2 produced from thermally bent float glass, an inner pane 3 likewise produced from thermally bent float glass, and a joining layer located in between in the form of a known PVB film 4. The glass pane 1 is a windshield of a motor vehicle, the outer pane 2 consisting of 2.1 mm thick clear glass with a transmission coefficient between about 0.88 and 0.93, whereas the inner pane 3 is produced from tinted glass. The glass pane 1 has an outer side 5 which faces the outside of the vehicle when the glass pane 1 is installed and is formed by the outer surface of the outer pane 2, and an inner side 6 facing the interior of the vehicle, which is formed by the inner surface of the inner pane 3.

In the inner pane 3 there is a hole 7 for a pyramid-shaped three-dimensional angle of view 8, whose rectangular base area 9 represents the field of view of a detector 10 for electromagnetic radiation, in particular in the form of a light-sensitive chip (CCD or CMOS component), a photodiode, a diode array or a photomultiplier. The beam path to the detector 10 is set up in such a way that, on four edges (see the four corners 11 of a trapezium 12 in FIG. 2), it passes the edges of the hole 7 with little or no spacing. The trapezium 12 forms the projection of the pyramid-shaped beam path into the glass pane 1, assumed to be flat approximately in the region of the hole 7.

Furthermore, FIG. 2 reveals that the hole has an elliptical shape. This is expedient since the trapezium 12 can be inscribed quite well in an ellipse, which means that, given a comparatively small cross-sectional area of the hole 7, a comparatively large cross-sectional area of the beam path passing through can be implemented. For production reasons and for reasons of adequate strength, it is not possible to produce the hole exactly in the form of the trapezium 12, since corners would provoke intolerable stress peaks. However, it is conceivable to implement the hole 7 in the form of a trapezium with sharply rounded corners. In principle, any other geometric shape of the hole 7 is of course also conceivable, as long as an adequate passage cross section for the beam path to the detector 10 remains. In the case of an elliptical shape of the hole 7, its long extent 13 (see FIG. 2) is about 40 mm to 120 mm and its short extent 14 is about 20 mm to 80 mm.

The embodiment illustrated in FIGS. 1 and 2 can be both an active and passive system. While in the case of an active system the detector 10 is simultaneously also provided with a transmitting unit, the detector 10 in the alternative passive form merely contains a receiving unit. As an alternative to the embodiment shown, active systems can also be constructed in such a way that they have a separate transmitting and receiving unit. While the transmitting unit is arranged behind a first hole and emits electromagnetic radiation, the receiving unit is located behind a second hole separated physically from the first hole. Both in the transmitting unit and in the receiving unit, the beam path runs through an associated hole, that is to say does not have to penetrate the material of the inner pane 3 in both cases but only the material of the outer pane 2 having better transmission properties.

An alternative embodiment of a glass pane 1', illustrated in FIG. 3, constitutes what is known as a single-sheet safety glass. In the glass pane 1' there is a hole 7', into which the front part 15 of a detector 10' is inserted. The cross section of the front part 15 is matched to the cross section of the hole 7', so that if need be a small annular space 16 remains for a seal, not illustrated. The front side 17 of the detector 10', facing outward, terminates flush with the outer side 5 of the glass pane 1'. The rear part 18 of the detector 10', arranged behind the inner side 6 of the glass pane 1', is widened in the manner of a flange outside the hole 7'. With its circumferential edge 19, the detector 10' is thus supported on the inner side 6 of the glass pane 1', which ensures a correct installation position. There can also be a sealing material between contact surfaces of the edge 19 and the edge strip of the inner side of the glass pane 1' surrounding the hole 7'. The front side 17, starting from which the viewing angle 20 indicated by lines is illustrated, can also be set back with respect to the outer side 5 of the glass pane 1'. While in the example illustrated in FIG. 3 the beam path leaves the detector 10' in the plane of the outer side 5 of the glass plane 1', in the said second case the exit cross section of the beam path is set back in the direction of the inner side 6 of the glass pane 1'. However, the last-named embodiment is not favored because of the surface not being flush in this case. The glass pane 1' is produced from a highly tinted float glass and is used, for example, as a comparatively steeply oriented rear window or side window of a vehicle. The transmission properties of the material 1' are such that the beam path of the electromagnetic radiation could not penetrate the glass pane 1' outside the hole 7' with a sufficient intensity in the definitive wavelength or frequency range, so that in this case the requisite minimum signal intensity could not be reached in the detector 10'.

The invention claimed is:

1. A glass pane having an inner side and an outer side and a detector located on the inner side for electromagnetic radiation which, coming from the outer side, passes through the glass pane and can be detected by means of the detector, the glass pane being a composite pane with an inner pane and an outer pane, which are joined to each other with the aid of a film arranged between the inner pane and the outer pane, wherein the beam path of the electromagnetic radiation leading to the detector penetrates only the material of the outer pane and passes through the plane of the inner pane in the region of a continuous hole, and wherein the beam path runs encapsulated within a housing, which closely adjoins the inner side of the glass pane or the circumferential surface bounding the hole.

2. The glass pane as claimed in claim 1, wherein the hole in the inner pane is produced before a bending-reshaping treatment of the inner pane and the edge region of the hole has edge stresses running peripherally in the form of compressive stresses.

3. The glass pane as claimed in claim 1, wherein the film is removed in the region of the hole or the beam path passing through the latter.

4. The glass pane as claimed in claim 1, wherein the outer pane has a transmission coefficient with respect to the electromagnetic radiation that can be detected by the detector which lies in the range between 0.80 and 0.93.

5. The glass pane as claimed in claim 1, wherein a receptor plane of an element of the detector that is sensitive to electromagnetic radiation is to be arranged further in the direction of the outer side of the glass pane than a plane defined by the inner side of the glass pane in an edge region of the hole.

6. The glass pane as claimed in claim 1, wherein a receptor plane of an element of the detector that is sensitive to electromagnetic radiation is to be arranged further in the direction of the inner side of the glass pane than a plane defined by the inner side of the glass pane in an edge region of the hole.

7. The glass pane as claimed in claim 1, wherein the hole has the form of an oval, an ellipse or a rounded trapezium in a section plane running parallel to the inner side or the outer side.

8. The glass pane as claimed in claim 7, wherein the hole has the form of an oval.

9. The glass pane as claimed in claim 7, wherein the hole has the form of an ellipse.

10. The glass pane as claimed in claim 7, wherein the hole has the form of a rounded trapezium in a section plane running parallel to the inner side or the outer side.

11. The glass pane as claimed in claim 1, wherein a transmitter for emitting such electromagnetic radiation that the radiation reflected by objects that are located in front of the glass pane at a distance from the outer side of the glass pane can be detected by a detector, the transmitter and the detector being combined structurally to form a transmission-detector unit or being spaced physically apart from each other, and the respective beam path penetrating the glass pane in one or different holes.

\* \* \* \* \*

UNITED STATES PATENT AND TRADEMARK OFFICE
CERTIFICATE OF CORRECTION

| | | |
|---|---|---|
| PATENT NO. | : 8,421,011 B2 | Page 1 of 1 |
| APPLICATION NO. | : 12/676679 | |
| DATED | : April 16, 2013 | |
| INVENTOR(S) | : Martin Melcher et al. | |

It is certified that error appears in the above-identified patent and that said Letters Patent is hereby corrected as shown below:

On the Title Page, Item (75) in Column 1, the fourth inventor's residence is incorrect.
    Item (75) should read
    -- Marc Maurer, Compiegne (FR) --

Signed and Sealed this
Twenty-fifth Day of June, 2013

Teresa Stanek Rea
*Acting Director of the United States Patent and Trademark Office*